Figure 1:
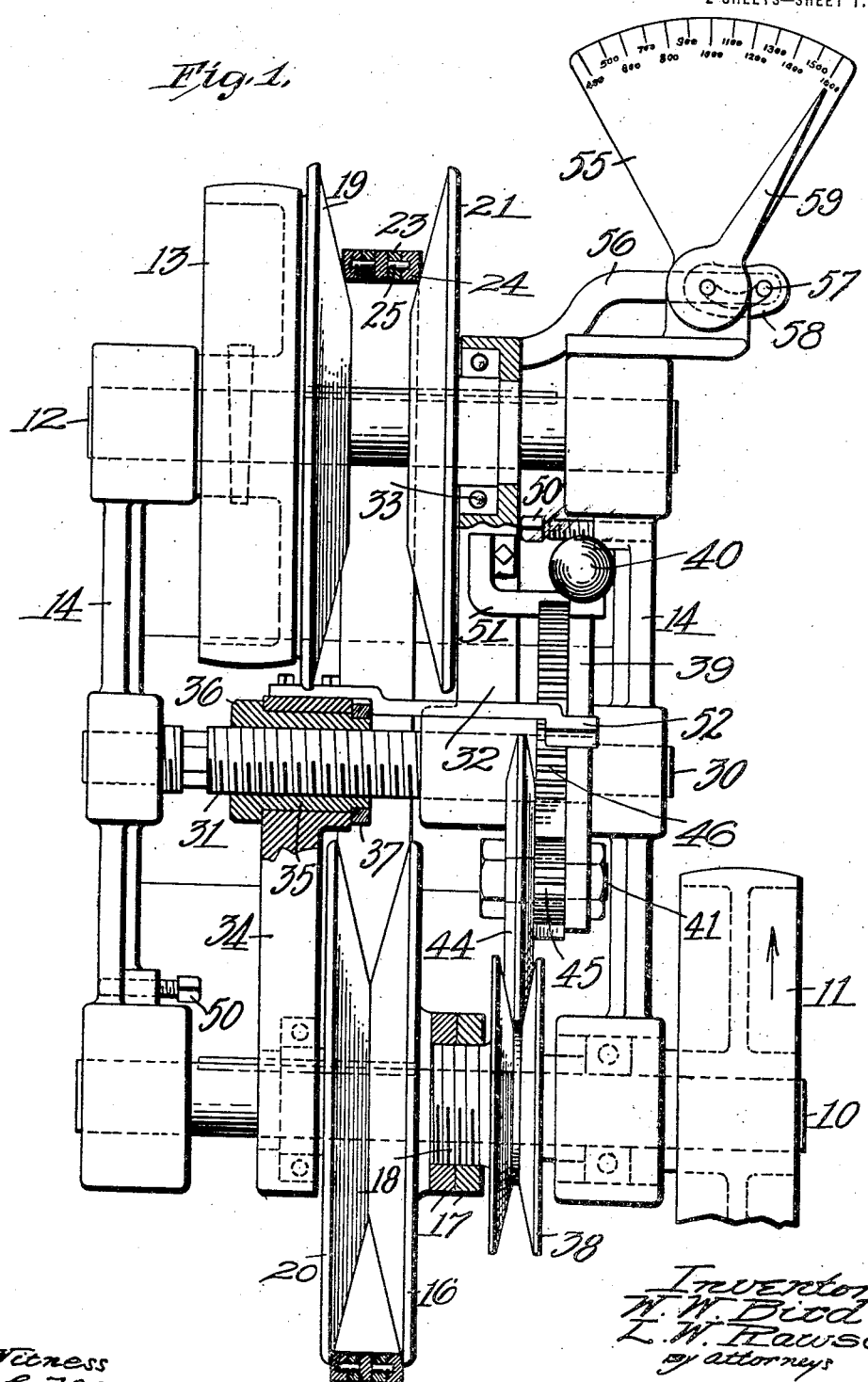

W. W. BIRD AND L. W. RAWSON.
VARIABLE SPEED DEVICE.
APPLICATION FILED JUNE 11, 1918.

1,324,952.

Patented Dec. 16, 1919.
2 SHEETS—SHEET 1.

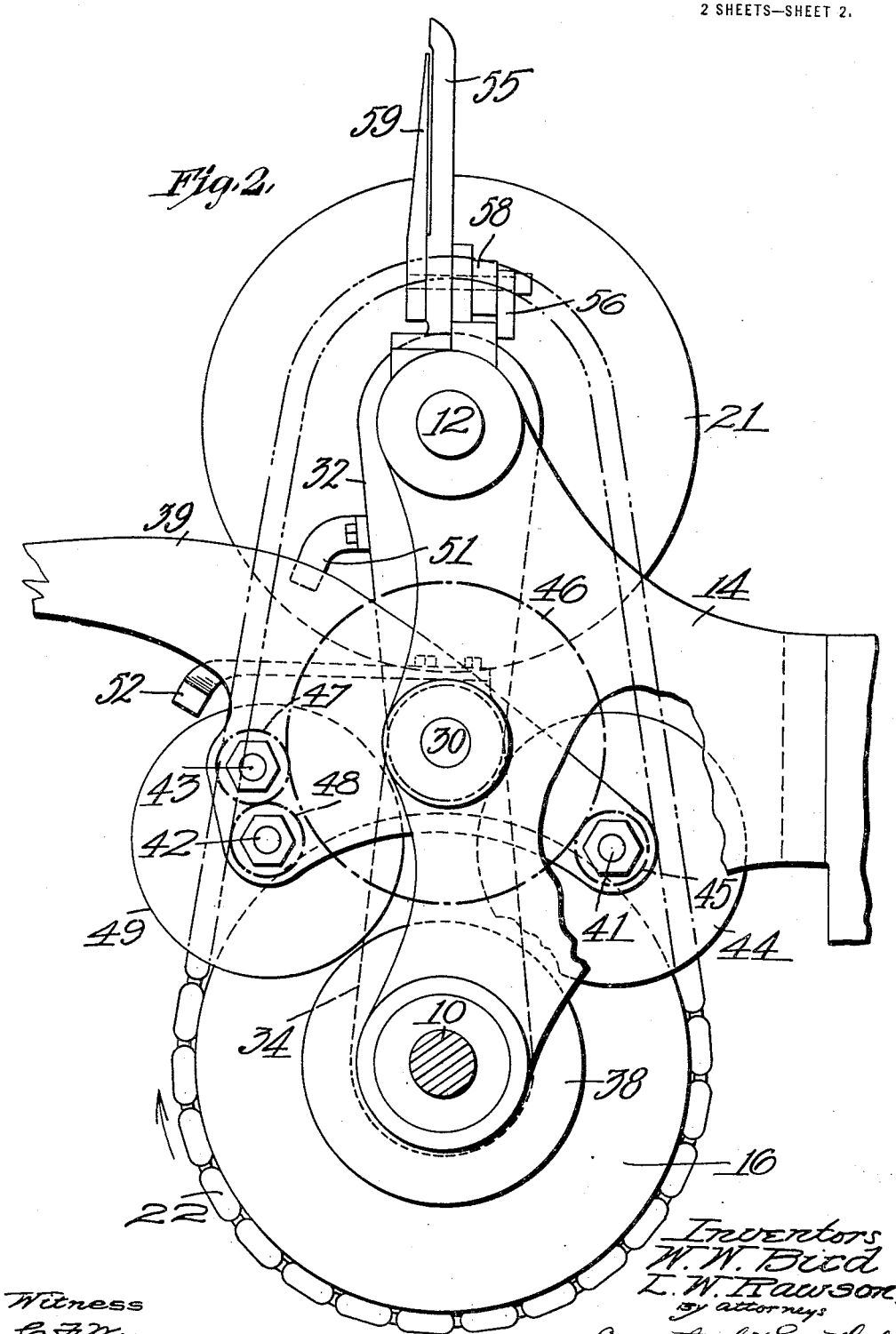

UNITED STATES PATENT OFFICE.

WILLIAM W. BIRD AND LOUIS W. RAWSON, OF WORCESTER, MASSACHUSETTS.

VARIABLE-SPEED DEVICE.

1,324,952.  Specification of Letters Patent.  Patented Dec. 16, 1919.

Application filed June 11, 1918. Serial No. 239,456.

*To all whom it may concern:*

Be it known that we, WILLIAM W. BIRD and LOUIS W. RAWSON, citizens of the United States, residing at Worcester, in the county of Worcester and State of Massachusetts, have invented a new and useful Variable-Speed Device, of which the following is a specification.

This invention relates to that type of variable speed mechanism in which the power is transmitted from one shaft to another by a belt passing over two expansible pulleys each made up of two conical disks, one disk of each pulley being movable to increase the effective diameter of one while decreasing the effective diameter of the other.

The principal objects of the invention are to provide a construction by which the motion of the movable elements can be depended upon to produce a definite speed change for a definite range of motion without danger of material variation thereafter due to slippage or stretching of the belt; to provide adjustments by which the position of the center of the belt can be varied to accommodate the length of the belt; to provide a convenient and simple power operated device by which the two pulleys can be changed to vary the speed; to provide an indicator showing directly the speed ratio or if desired the revolutions per minute of the driven shaft; and to provide an automatic stopping arrangement for the power operated adjustment.

Further objects and advantages of the invention will appear hereinafter.

Reference is to be had to the accompanying drawings, in which—

Figure 1 is a front elevation of a preferred embodiment of this invention showing certain parts in section to show the interior construction, and Fig. 2 is a side view of the same.

In the form shown, a power shaft 10 receives power through the pulley 11 and transmits it to a driven shaft 12 having a pulley 13 from which the power is taken. These shafts are mounted in bearings on a frame 14 on which the entire device is supported. The driving shaft is provided with a pulley section or conical disk 16 which is designed to be fixed to this shaft, but for reasons to be explained it is made adjustable to a slight extent and is mounted on a screw-threaded bushing 18 fixed on the shaft. Adjusting and locking nuts 17 are provided for fixing it in position, and after adjustment this disk 16 acts as a fixed member on the shaft 10.

The shaft 12 is provided with a conical disk 19 which is fixed on that shaft and is shown as being fixed also with respect to the pulley 13, and constituting part thereof, although that is not a feature of this invention.

Coöperating with the two disks 16 and 19 are two movable disks 20 and 21. It will be understood, as has been known in this art before, that the two disks 16 and 20 constitute an expansible pulley and also the two disks 19 and 21. It is intended that the disks 20 and 21 shall be moved simultaneously either to the right or to the left so that the effective diameters of the two pulleys shall change as may be desired without materially affecting the length of the belt necessary to transmit power from one to the other.

It has been a serious problem heretofore to adapt this type of variable speed transmission to practical purposes because of the difficulty of getting a belt suitable for use on double conical pulleys that would not stretch, and thus run loose under certain conditions of adjustment, and yet would have a surface capable of transmitting the power without undue slippage. For the purpose of avoiding these difficulties, we have shown a belt comprising solid links 22 made up of layers 23 of indurated fiber or the like inside, and outside layers 24 of leather, these leather external layers being beveled off to the desired angle to contact with the conical disks at all times, and the fiber layers constituting the solid means by which the links are pivoted together through the instrumentality of sheet metal pivoted connectors 25. In this way the non-stretchable feature is secured and yet the belt is perfectly flexible, its durability is of the greatest, and its transmitting powers also. This is an improvement over a metal link belt transmission because of the fact that such belts do not have an efficient surface for transmitting the power.

In order to provide for moving the movable disks or sections of the pulleys in an easy and effective way, the frame 14 is provided with a rotatable shaft 30 provided with a screw-threaded portion 31. This screw-threaded portion screws through an arm 32 which is slidably mounted with respect to the shaft 12 and which has a ball bearing 33, shown diagrammatically supporting the disk 21. This disk moves with the arm 32 along the shaft 12, but of course is keyed to this shaft so as to transmit power to it directly. On the screw thread 31 is also mounted the other arm 34, but this arm is arranged adjustably by providing an internally screw-threaded bushing 35 engaging the screw directly and passing through an opening in the arm 34. This bushing 35 has a hexagonal head 36, and a nut 37 on the other side of the arm arranged to tighten up the arm against the bushing and keep it in place. The arm 34 moves the disk 20 back and forth with it as has been described in connection with the arm 32.

For the purpose of rotating the shaft 30 by power, the shaft 10 is provided with a wheel 38 fixed to it and of course rotating with it. For convenience, this wheel is shown as integral with the bushing 18 and it has an internal double conical driving surface. On the shaft 30 is pivoted a frame 39 having a handle 40 for operating it and provided with three studs 41, 42 and 43. The stud 41 has rotatably mounted upon it a wheel 44 and a pinion 45 fixed with respect to each other, the wheel 44 having a double external conical surface for engaging the surface of the wheel 38. The pinion 45 meshes with a gear 46 keyed to the shaft 30. Also meshing with this gear is a pinion 47 on the stud 43 which in turn meshes with a pinion 48 on the stud 42. This stud 42 carries a wheel 49 exactly like the wheel 44 and fixed to the pinion 48 to rotate it.

It will be seen that when the handle is moved as far up as it will go, the wheel 44 engages the wheel 38 and directly rotates the shaft 30 through the pinion 45 and gear 46 in one direction. When the handle 40 is lowered the wheel 44 moves out of engagement with the wheel 38 and the wheel on the other side moves into engagement with it, and through the pinions 48 and 47 and gear 46 rotates the shaft 30 in the opposite direction.

The rotation of the shaft in either direction will move the two disks 20 and 21 along their respective shafts and change the speed ratio. For the purpose of stopping this motion, two adjustable stops 50 are shown, but in addition to these or in place of them another device is illustrated. This consists of an arm 51 extending from the arm 32 and having a beveled end for engaging over the arm 39 when that moves over to the position shown in Fig. 1, and depressing the handle 40 so as to disengage the wheel 44 from the wheel 38. Motion in the other direction is stopped by an arm 52 extending from the arm 34 but located under the arm 39 so as to raise it when the arm 34 comes into the position to engage the stop shown at its left.

For the purpose of directly indicating the speed ratio or the speed secured, the following mechanism is illustrated. Fixedly mounted on the frame 14 is a registering dial 55, and on the arm 32 is an extension 56 having a pin 57 thereon. Pivotally mounted on the dial 55 or the bracket which supports it is a cam 58 and a pointer 59 rigidly connected with each other. The cam is adapted to engage the pin 57, so the longitudinal motion of the pin 57 with the arm 32 swings the pointer 59 and causes it to indicate directly either the speed ratio or the absolute speed of the shaft 12.

In view of the adjustability of the arm 34, it will be understood that one of the fixed disks 16 and 19 ought to be adjustably mounted also, and that is the purpose of the adjustment means 17—18 previously referred to. This adjustment provides for centering the belt and also compensates for the fact that a link belt, such as has been described, cannot be made of any desired length but must be arranged to have a certain number of links, and consequently the adjustment has to be made to accommodate the length of the belt which has to be used for any particular setting of the machine.

In this way it will be seen that the machine can be set to any degree of nicety so as to transmit power with a high degree of efficiency that after considerable use will be maintained substantially at its original efficiency. The coöperation of the conical disks with the non-stretchable belt having leather transmitting surfaces to contact with the conical disks is an important feature. The adjustment of the disks by power in either direction is made very easy. A workman cannot carry this adjustment too far on account of the automatic stops. As this operation is not positive there is no danger of any important injury to the machine anyway.

Although we have illustrated and described only a single embodiment of the invention, we are aware of the fact that many modifications can be made therein by any person skilled in the art without departing from the scope of the invention as expressed in the claims. Therefore we do not wish to be limited to all the details of construction herein shown and described, but what we do claim is—

1. In a power transmitting device, the combination of two shafts, two pulleys thereon each comprising a member slidably mounted on its shaft, a speed indicating device, and a connection with one of said movable members for causing the speed indicating device always to indicate the speed to be produced by the transmitting device as the movable member moves along its shaft.

2. In a variable speed power transmitting device, the combination with a power receiving shaft and a power transmitting shaft, of an expansible pulley on each shaft, each of said pulleys consisting of a conical disk fixed to the shaft and a conical disk movable along the shaft, a belt for said pulleys, means for adjustably fixing one of the said fixed disks to its shaft, a pair of arms, one connected with each of the movable disks for operating it, a screw to which said arms are connected and by which they are adapted to be moved in either direction, and an internally threaded bushing on the screw for adjustably connecting one of said arms with the screw.

3. In a variable speed power transmitting device, the combination with two shafts, two pulleys thereon each consisting of a disk fixed to its shaft and a disk slidably mounted on its shaft, of a rotatable screw, an arm connected with each of the movable disks and having connection with said screw, whereby said arms are simultaneously moved longitudinally when the screw is turned, and means for operating said screw from one of said shafts.

4. In a variable speed power transmitting device, the combination of two shafts between which power is to be transmitted, two pulleys thereon each consisting of a disk fixed to its shaft and a disk slidably mounted on its shaft, with a rotatable screw between said shafts, an arm connected with each of the movable disks and having connection with said screw, whereby said arms are simultaneously moved longtiudinally when the screw is turned, a friction wheel on one shaft, a gear keyed to the screw, an operating arm pivotally mounted, and a gear and friction wheel rotatably mounted on said arm but fixedly connected together, the gear meshing with the first named gear and the wheel adapted to engage the first named friction wheel when the handle is moved to a certain position.

5. In a variable speed power transmitting device, the combination of two shafts, a pulley on each shaft consisting of a disk fixed to its shaft and a disk slidably keyed on its shaft, with a rotatable screw, two arms, each connected with one of the movable disks and having connection with said screw, whereby said arms are simultaneously moved longitudinally when the screw is turned, a handle pivotally mounted on said screw, a pair of friction wheels rotatably mounted on said handle, a wheel on one of said shafts with which each of said friction wheels is adapted to engage, but not both at the same time, according to the position of the handle, means supported by said handle for transmitting power from one friction wheel to said screw in one direction, and means for transmitting power from the other friction wheel to the screw in the other direction.

6. In a variable speed power transmitting device, the combination of two shafts, a pulley on each shaft consisting of a disk fixed to its shaft and a disk slidably keyed on its shaft, with a rotatable screw, two arms, each connected with one of the movable disks and having connection with said screw, whereby said arms are simultaneously moved longitudinally when the screw is turned, a handle, a pair of friction wheels rotatably mounted on said handle, a wheel on one of said shafts with which each of said friction wheels is adapted to engage, but not both at the same time, according to the position of the handle, means for transmitting power from one friction wheel to said screw in one direction, means for transmitting power from the other friction wheel to the screw in the other direction, and means for automatically moving the handle to disengage the friction wheels at the end of its range of motion.

7. In a variable speed power transmitting device, the combination with two shafts, two pulleys thereon each consisting of a disk fixed to its shaft and a disk slidably mounted on its shaft, of a rotatable screw, an arm connected with each of the movable disks and having connection with said screw, whereby said arms are simultaneously moved longitudinally when the screw is turned, means for operating said screw from one of said shafts, and means for automatically stopping the screw.

8. In a variable speed power transmitting device, the combination of two shafts, two pulleys thereon each consisting of a disk fixed to its shaft and a disk slidably mounted on its shaft, with a rotatable screw, an arm connected with each of the movable disks and having connection with said screw, whereby said arms are simultaneously moved longitudinally when the screw is turned, means for operating said screw from one of said shafts, a speed indicating device, and a connection between one of said movable arms and said speed indicating device for operating it as the arm moves longitudinally so as to show the speed for which the power transmitting device is set.

In testimony whereof we have hereunto affixed our signatures.

WILLIAM W. BIRD.
LOUIS W. RAWSON.